UNITED STATES PATENT OFFICE.

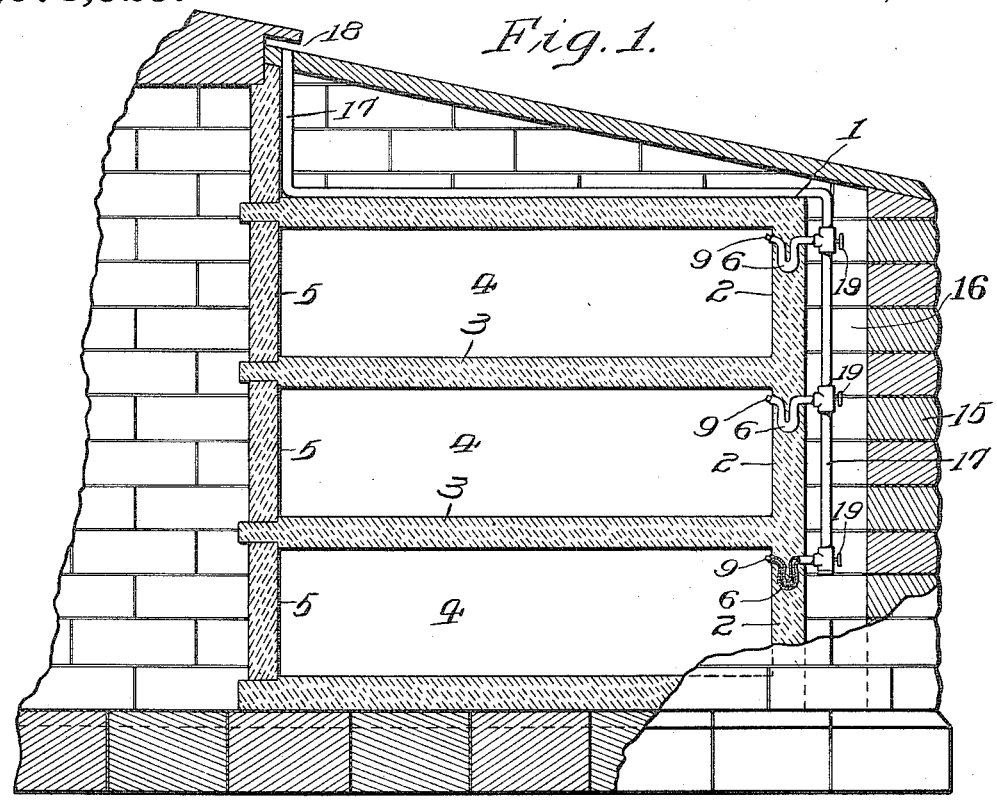

DAVID D. LANDIS, OF OBERLIN, OHIO, ASSIGNOR OF ONE-THIRD TO SAMUEL S. BRICKER AND ONE-THIRD TO BARNEY B. BRICKER, OF PHILADELPHIA, PENNSYLVANIA.

BURIAL DEVICE.

1,078,929.  Specification of Letters Patent.  Patented Nov. 18, 1913.

Application filed July 20, 1912. Serial No. 710,536.

*To all whom it may concern:*

Be it known that I, DAVID D. LANDIS, a citizen of the United States, and a resident of the city of Oberlin, county of Lorain, and State of Ohio, have invented certain new and useful Improvements in Burial Devices, of which the following is a specification.

The main objects of this invention are, to provide an improved burial receptacle; to provide in a burial receptacle improved self-sealing means for permitting the escape of gases therefrom and for disinfecting and deodorizing the escaping gases; to provide an improved deodorizer and disinfector; to provide an improved automatic self-sealing trap; and to provide other improvements as will appear hereinafter.

In the accompanying drawings, Figure 1 is a vertical section of a mausoleum constructed in accordance with this invention and adapted to contain a plurality of bodies; Fig. 2 is an enlargement of a portion of Fig. 1; and Fig. 3 is a vertical section of a burial receptacle constructed in accordance with this invention and adapted to contain but a single body.

Referring to the drawings, one embodiment of this invention comprises, as illustrated in Fig. 1, a hollow air-tight receptacle 1, including a hollow air-tight main portion 2, sub-divided by a plurality of substantially horizontal vertically spaced partitions 3 to form a plurality of oblong air-tight cells 4, arranged in vertical series. Each of the cells 4 is hermetically sealed at its front end by a door or closure 5, and each cell is preferably adapted to contain but a single body.

The main portion 2 of the receptacle 1, including the partitions 3, is preferably monolithic in construction, being preferably made of cement. Any other suitable construction and any other suitable material, or materials, may, however, be utilized, instead of the monolithic cement construction, to form the main portion 2 and doors 5 of the receptacle 1.

For permitting the escape of gases from the cells 4 of the receptacle 1, and for deodorizing and disinfecting the escaping gases, each cell 4 is provided with a substantially U-shaped trap 6 which communicates at one end with the interior of the cell, preferably through the rear end wall of the cell and at a point adjacent the top of the cell, for reasons that will appear hereinafter. At its other end each trap 6 preferably communicates, when in operation, with a suitable duct for conveying the discharged gases to any desired point. These traps 6 are preferably substantially entirely embedded or inclosed by the rear wall of the receptacle, and are preferably made of glass or other suitable material which will not be subject to corrosion or disintegration or other destructive action, to which they might be subjected in performing their functions.

Each trap 6 is prepared for use by being charged with an improved liquid seal which will prevent the passage of air inwardly through the trap under ordinary atmospheric pressure, but which will permit the passage of gases outwardly from the trap when the pressure in the corresponding seal is increased above the atmospheric pressure by the gases formed during the partial decomposition of a body within the cell. This improved seal may be made of any suitable liquid, or material, or materials, but preferably includes material that will act as a deodorizer and disinfectant of the gases passing therethrough. Furthermore, this seal is preferably formed of a material or substance, or mixture of materials or substances, that after a suitable period of time will solidify and harden to form a permanent solid seal or closure for hermetically sealing the trap. This improved seal may be formed, among other ways, by partially filling the trap with granulated or comminuted silica, for instance, up to the level indicated by 7, and then adding equal parts of wood alcohol or grain alcohol and formaldehyde, and a suitable amount of silicate of soda or liquid glass, about three ounces of the silicate or glass being sufficient in the form of trap illustrated, to bring the level of the seal about up to the point indicated by 8. The granulated silica acts as a percolator for dividing the current of gas to bring into contact with the formaldehyde every particle of the gas discharged from the cell 4, so that there may be a complete deodorization and disinfection of the gas. The formaldehyde performs its usual function as a germicide and its action is facilitated by the alcohol. The silicate of soda or liquid glass, upon evaporation, fills all the interstices of the granulated silica with solid glass, making in combination with the silica a solid silica stone, or stone-like composition, forming a hard permanent closure in the trap for hermetically sealing the trap.

The materials for forming the seal in the trap 6 are not placed in the trap until the receptacle 1 has been arranged in its permanent resting place. After the materials for forming this seal have been placed in the trap 6, a conical stopper or closure 9 is fitted snugly into the inner end of the trap, the inner end of the trap being preferably flared inwardly and upwardly to make a tight fit for the stopper, and also to provide a suitable funnel for the convenient charging of the trap with its seal. The outer end of the trap 6 is preferably provided with only a comparatively small aperture or outlet 10, so as to practically prevent evaporation of, or change in the seal while the inner end of the trap is closed by the stopper, and to retard the flow of gases outwardly through the trap after the stopper has been removed. Evaporation of the seal through the inner end of the trap, when the stopper is removed, will be prevented by the pressure within the cell, as will appear hereinafter.

This improved receptacle may be inclosed in an outer casing 15, the rear wall of the receptacle being preferably spaced from the inner surface of the casing to form a passage 16. Arranged in the passage 16 is an upwardly extending pipe or conveyer 17, the lower portion of which communicates with the outer ends of the traps, and the upper end 18 of which opens through the top of the casing 15 into the atmosphere outside of the casing. A needle valve 19, or other suitable valve, may be arranged, as, for instance, through the pipe 17, to control the outlet 10 in the outer end of each trap 6.

Instead of applying this invention to form a receptacle having a plurality of cells, as heretofore described, it is obvious that this invention may be applied, as shown in Fig. 3, to form a receptacle 1 which provides but a single air-tight cell 4, closed by a door 5 and provided with a trap 6 and seal, as hereinbefore described.

In any case, this improved receptacle may be manufactured at any convenient place and transported as a whole to any desired destination, or it may be constructed upon the place where it is intended to be used. The traps and the mixture for forming the seals might obviously be manufactured as separate articles of commerce.

In the operation of this improved receptacle, when it is desired to utilize one of the cells 4, the door 5 of the cell is opened and the corresponding stopper 9 is removed from the corresponding trap 6, the trap having been previously filled with suitable materials to form a seal, as hereinbefore described. The body is then placed in the cell, and the door or closure 5 is then secured in place and hermetically sealed in the usual manner. Presumably, as the body in the cell gradually decomposes, carbon dioxid is formed, and this gas, being heavier than air, falls to the bottom of the cell and gradually increases in depth until it entirely covers the body, the free oxygen, nitrogen, and other gases being thus gradually driven out through the trap, where the outgoing gases are deodorized and disinfected by the germicide and other materials in the trap, as hereinbefore described. It is understood that the carbon dioxid gas, by protecting the body from the action of the oxygen in the air, prevents the decomposition of the body. After this process has been allowed to continue for a sufficient length of time, to entirely inclose the body in the protecting layer of carbon dioxid and to expel all the free gases and other gases from the cell, it will be found that the materials forming the seal in the trap 6 have gradually evaporated and solidified to form a hard stone-like permanent closure for the trap and to hermetically seal the cell, thus maintaining the body in its protecting envelop of carbon dioxid and, consequently, thus preserving it indefinitely against any further decomposition. The period allowed for this process of evaporation and solidification of the seal may be diminished or increased, as may be found desirable, by increasing or diminishing the size of the opening 10 in the outer end of the trap. This opening 10 may be so proportioned that the seal in the trap would solidify in a few months, or it may be so proportioned that it would take several years to complete the process of solidification.

It is to be understood that this invention is not limited to any specific construction or to any specific materials for forming the receptacle, the trap, or the improved seal, forming the subject-matter of this invention. It is also evident that the improved seal hereinbefore disclosed may be applied to various purposes other than the one hereinbefore described, without departing from the scope of the invention as defined in the appended claims:

Having thus described my invention, I claim and desire to protect by Letters Patent of the United States:

1. In a burial device, a hollow receptacle providing a cell and provided with a trap forming an outlet for said cell, and a seal in said trap, said seal being formed of material that will solidify after a period of operation and form a permanent closure for said trap.

2. In a burial device, a receptacle provided with a trap forming an outlet for said receptacle, and a seal in said trap, said seal including finely divided solid material and liquid material that will eventually form with said solid material a permanent solid closure for said trap.

In witness whereof, I have hereunto set my hand this 16th day of July, A. D., 1912.

DAVID D. LANDIS.

Witnesses:
  JOSEPH S. ARNOLD,
  WINFIELD S. STITELEY.